United States Patent
Wang et al.

(10) Patent No.: US 12,177,813 B2
(45) Date of Patent: Dec. 24, 2024

(54) TECHNIQUES FOR RESOURCE ALLOCATION FOR AVOIDING BEAM CONFLICT IN SIDELINK COMMUNICATIONS

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/452,323

(22) Filed: Oct. 26, 2021

(65) Prior Publication Data

US 2023/0129790 A1    Apr. 27, 2023

(51) Int. Cl.
| | |
|---|---|
| *H04W 72/02* | (2009.01) |
| *H04W 72/044* | (2023.01) |
| *H04W 72/0446* | (2023.01) |
| *H04W 72/20* | (2023.01) |

(52) U.S. Cl.
CPC ....... *H04W 72/02* (2013.01); *H04W 72/0446* (2013.01); *H04W 72/046* (2013.01); *H04W 72/20* (2023.01)

(58) Field of Classification Search
CPC .................................... H04W 72/0446
USPC .......................................... 370/329
See application file for complete search history.

(56) References Cited

U.S. PATENT DOCUMENTS

| | | | | |
|---|---|---|---|---|
| 2020/0145888 | A1* | 5/2020 | Paladugu | H04W 80/02 |
| 2020/0154430 | A1* | 5/2020 | Gulati | H04L 5/0094 |
| 2021/0105118 | A1* | 4/2021 | Wu | H04W 72/20 |
| 2022/0053420 | A1* | 2/2022 | Xue | H04W 52/0216 |
| 2022/0330241 | A1* | 10/2022 | Zhao | H04L 5/0048 |

(Continued)

FOREIGN PATENT DOCUMENTS

| | | | |
|---|---|---|---|
| EP | 1133094 A2 | 9/2001 | |
| WO | WO-2021134798 A1 * | 7/2021 | ........... H04L 5/0048 |
| WO | WO-2021163705 A1 * | 8/2021 | ....... H04L 27/26025 |

OTHER PUBLICATIONS

International Search Report and Written Opinion—PCT/US2022/045232—ISA/EPO—Feb. 14, 2023.

(Continued)

*Primary Examiner* — Anthony Mejia
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a sidelink configuration that indicates a set of sidelink slots comprising a first subset of sidelink slots to be used for first transmissions of sidelink communications and a second subset of sidelink slots to be used for second transmissions of the sidelink communications. The UE may communicate based at least in part on the sidelink configuration. Numerous other aspects are described.

23 Claims, 10 Drawing Sheets

(56) References Cited

U.S. PATENT DOCUMENTS

| | | | |
|---|---|---|---|
| 2023/0022691 A1* | 1/2023 | Ji | H04W 72/02 |
| 2023/0129790 A1* | 4/2023 | Wang | H04W 72/046 |
| | | | 370/329 |
| 2023/0247550 A1* | 8/2023 | Yu | H04W 52/0216 |
| | | | 370/311 |
| 2023/0276461 A1* | 8/2023 | Lee | H04W 72/02 |
| | | | 370/329 |
| 2023/0379948 A1* | 11/2023 | Lin | H04L 5/0033 |
| 2023/0389088 A1* | 11/2023 | Xue | H04W 74/0808 |
| 2024/0031997 A1* | 1/2024 | Lin | H04W 4/40 |

OTHER PUBLICATIONS

Partial International Search Report—PCT/US2022/045232—ISA/EPO—Dec. 23, 2022.

* cited by examiner

TECHNIQUES FOR RESOURCE ALLOCATION FOR AVOIDING BEAM CONFLICT IN SIDELINK COMMUNICATIONS

FIELD OF THE DISCLOSURE

Aspects of the present disclosure generally relate to wireless communication and to techniques and apparatuses for resource allocation for avoiding beam conflict in sidelink communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a sidelink configuration that indicates a set of sidelink slots comprising a first subset of sidelink slots to be used for first transmissions of sidelink communications and a second subset of sidelink slots to be used for second transmissions of the sidelink communications. The method may include communicating based at least in part on the sidelink configuration.

Some aspects described herein relate to a method of wireless communication performed by a transmitting sidelink UE. The method may include receiving, from a receiving sidelink UE, an indication of beam information associated with a beam to be used to communicate with the receiving sidelink UE. The method may include transmitting a sidelink communication to the receiving sidelink UE based at least in part on the beam information.

Some aspects described herein relate to a method of wireless communication performed by a receiving sidelink UE. The method may include transmitting, to a transmitting sidelink UE, an indication of beam information associated with a beam to be used to communicate with the receiving sidelink UE. The method may include receiving a sidelink communication from the transmitting sidelink UE based at least in part on the indication of the beam information.

Some aspects described herein relate to a UE for wireless communication. The user equipment may include a memory and one or more processors coupled to the memory. The one or more processors may be configured to receive a sidelink configuration that indicates a set of sidelink slots comprising a first subset of sidelink slots to be used for first transmissions of sidelink communications and a second subset of sidelink slots to be used for second transmissions of the sidelink communications. The one or more processors may be configured to communicate based at least in part on the sidelink configuration.

Some aspects described herein relate to a transmitting sidelink UE for wireless communication. The transmitting sidelink user equipment may include a memory and one or more processors coupled to the memory. The one or more processors may be configured to receive, from a receiving sidelink UE, an indication of beam information associated with a beam to be used to communicate with the receiving sidelink UE. The one or more processors may be configured to transmit a sidelink communication to the receiving sidelink UE based at least in part on the beam information.

Some aspects described herein relate to a receiving sidelink UE for wireless communication. The receiving sidelink user equipment may include a memory and one or more processors coupled to the memory. The one or more processors may be configured to transmit, to a transmitting sidelink UE, an indication of beam information associated with a beam to be used to communicate with the receiving sidelink UE. The one or more processors may be configured to receive a sidelink communication from the transmitting sidelink UE based at least in part on the indication of the beam information.

Some aspects described herein relate to a non-transitory computer-readable medium that stores a set of instructions for wireless communication by a UE. The set of instructions, when executed by one or more processors of the UE, may cause the UE to receive a sidelink configuration that indicates a set of sidelink slots comprising a first subset of sidelink slots to be used for first transmissions of sidelink communications and a second subset of sidelink slots to be used for second transmissions of the sidelink communications. The set of instructions, when executed by one or more processors of the UE, may cause the UE to communicate based at least in part on the sidelink configuration.

Some aspects described herein relate to a non-transitory computer-readable medium that stores a set of instructions for wireless communication by a transmitting sidelink UE.

The set of instructions, when executed by one or more processors of the UE, may cause the UE to receive, from a receiving sidelink UE, an indication of beam information associated with a beam to be used to communicate with the receiving sidelink UE. The set of instructions, when executed by one or more processors of the UE, may cause the UE to transmit a sidelink communication to the receiving sidelink UE based at least in part on the beam information.

Some aspects described herein relate to a non-transitory computer-readable medium that stores a set of instructions for wireless communication by a receiving sidelink UE. The set of instructions, when executed by one or more processors of the UE, may cause the UE to transmit, to a transmitting sidelink UE, an indication of beam information associated with a beam to be used to communicate with the receiving sidelink UE. The set of instructions, when executed by one or more processors of the UE, may cause the UE to receive a sidelink communication from the transmitting sidelink UE based at least in part on the indication of the beam information.

Some aspects described herein relate to an apparatus for wireless communication. The apparatus may include means for receiving a sidelink configuration that indicates a set of sidelink slots comprising a first subset of sidelink slots to be used for first transmissions of sidelink communications and a second subset of sidelink slots to be used for second transmissions of the sidelink communications. The apparatus may include means for communicating based at least in part on the sidelink configuration.

Some aspects described herein relate to an apparatus for wireless communication. The apparatus may include means for receiving, from a receiving sidelink UE, an indication of beam information associated with a beam to be used to communicate with the receiving sidelink UE. The apparatus may include means for transmitting a sidelink communication to the receiving sidelink UE based at least in part on the beam information.

Some aspects described herein relate to an apparatus for wireless communication. The apparatus may include means for transmitting, to a transmitting sidelink UE, an indication of beam information associated with a beam to be used to communicate with the apparatus. The apparatus may include means for receiving a sidelink communication from the transmitting sidelink UE based at least in part on the indication of the beam information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
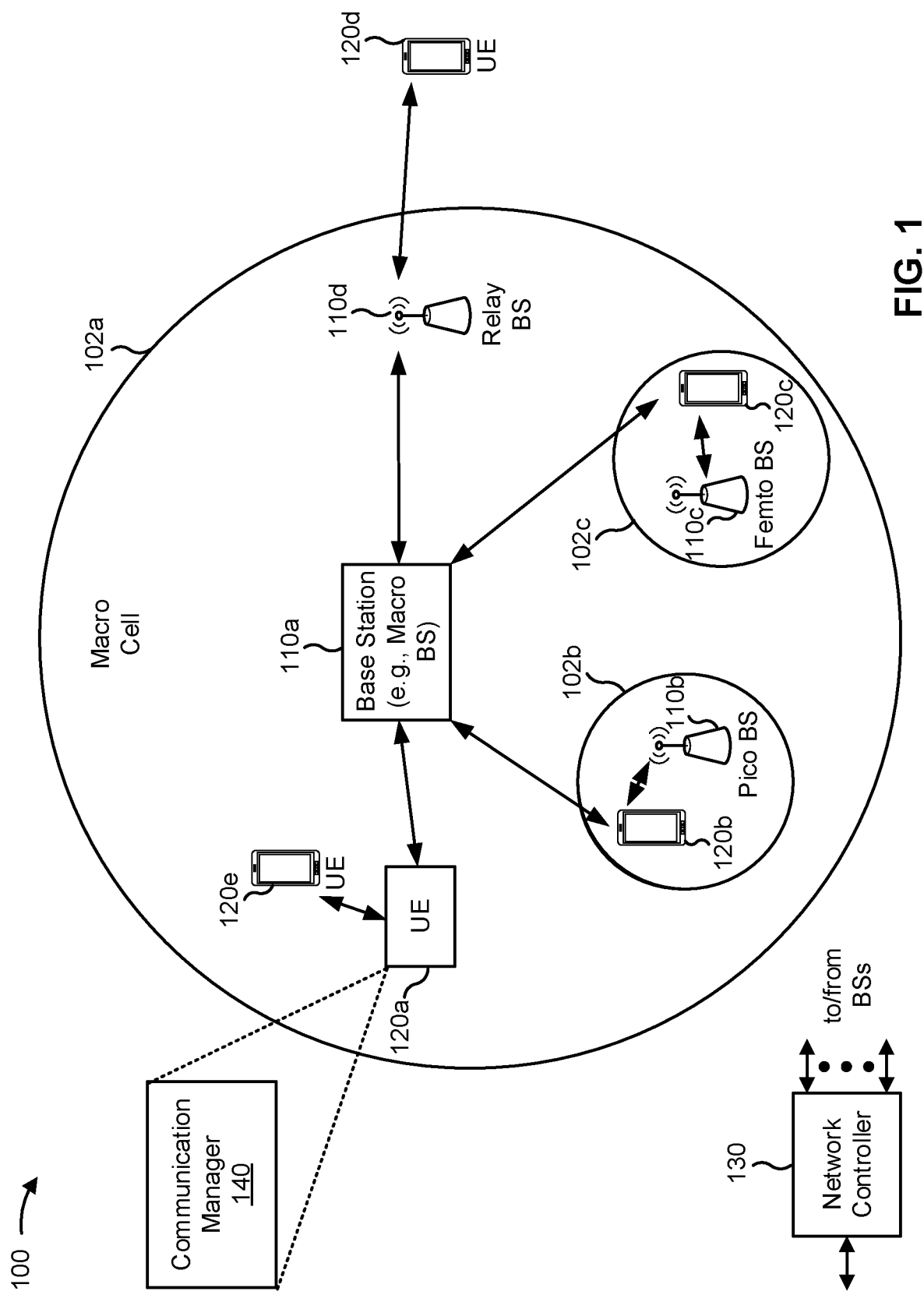
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a sidelink configuration that indicates a set of sidelink slots comprising a first subset of sidelink slots to be used for first transmissions of sidelink communications and a second subset of sidelink slots to be used for second transmissions of the sidelink communications; and communicate based at least in part on the sidelink configuration. In some aspects, the UE 120 may be a transmitting sidelink UE 120 and may include a communication manager 140. As described in more detail elsewhere herein, the communication manager 140 may receive, from a receiving sidelink UE, an indication of beam information associated with a beam to be used to communicate with the receiving sidelink UE; and transmit a sidelink communication to the receiving sidelink UE based at least in part on the beam information. In some aspects, the UE 120 may be a receiving sidelink UE 120 and may include a communication manager 140. As described in more detail elsewhere herein, the communication manager 140 may transmit, to a transmitting sidelink UE, an indication of beam information associated with a beam to be used to communicate with the receiving sidelink UE; and receive a sidelink communication from the transmitting sidelink UE based at least in part on the indication of the beam information. Additionally, or alternatively, the communication manager 140 may perform one or more other operations described herein.

As indicated above, FIG. 1 is provided as an example. Other examples may differ from what is described with regard to FIG. 1.

Figure 2:
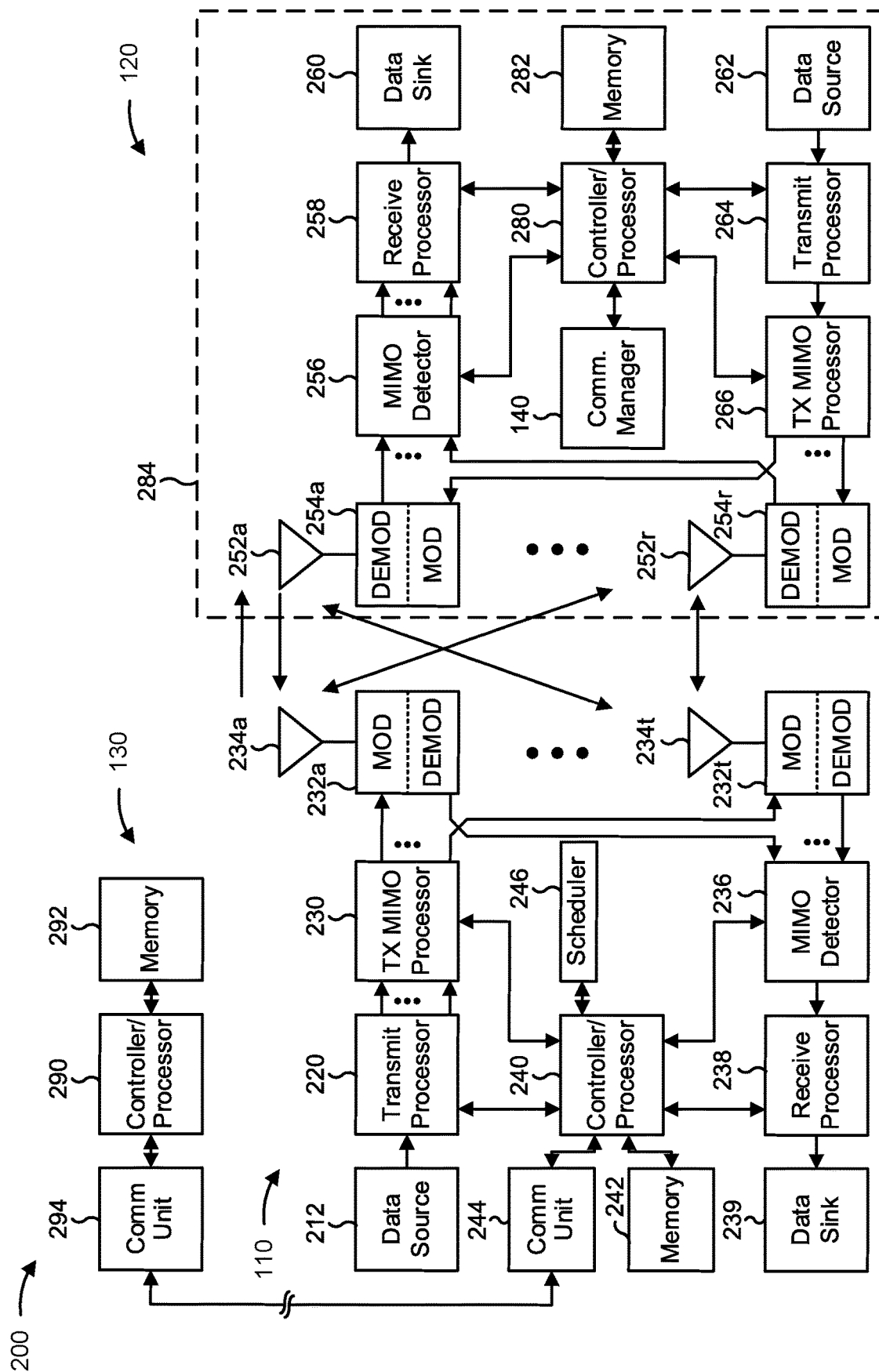
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmitting (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency (RF) signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with resource allocation for avoiding beam conflict in sidelink communications, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving a sidelink configuration that indicates a set of sidelink slots comprising a first subset of sidelink slots to be used for first transmissions of sidelink communications and a second subset of sidelink slots to be used for second transmissions of the sidelink communications; and/or means for communicating based at least in part on the sidelink configuration. In some aspects, the UE may be a transmitting sidelink UE that includes means for receiving, from a receiving sidelink UE, an indication of beam information associated with a beam to be used to communicate with the receiving sidelink UE; and/or means for transmitting a sidelink communication to the receiving sidelink UE based at least in part on the beam information. In some aspects, the UE may be a receiving sidelink UE that includes means for transmitting, to a transmitting sidelink UE, an indication of beam information associated with a beam to be used to communicate with the receiving sidelink UE; and/or means for receiving a sidelink communication from the transmitting sidelink UE based at least in part on the indication of the beam information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
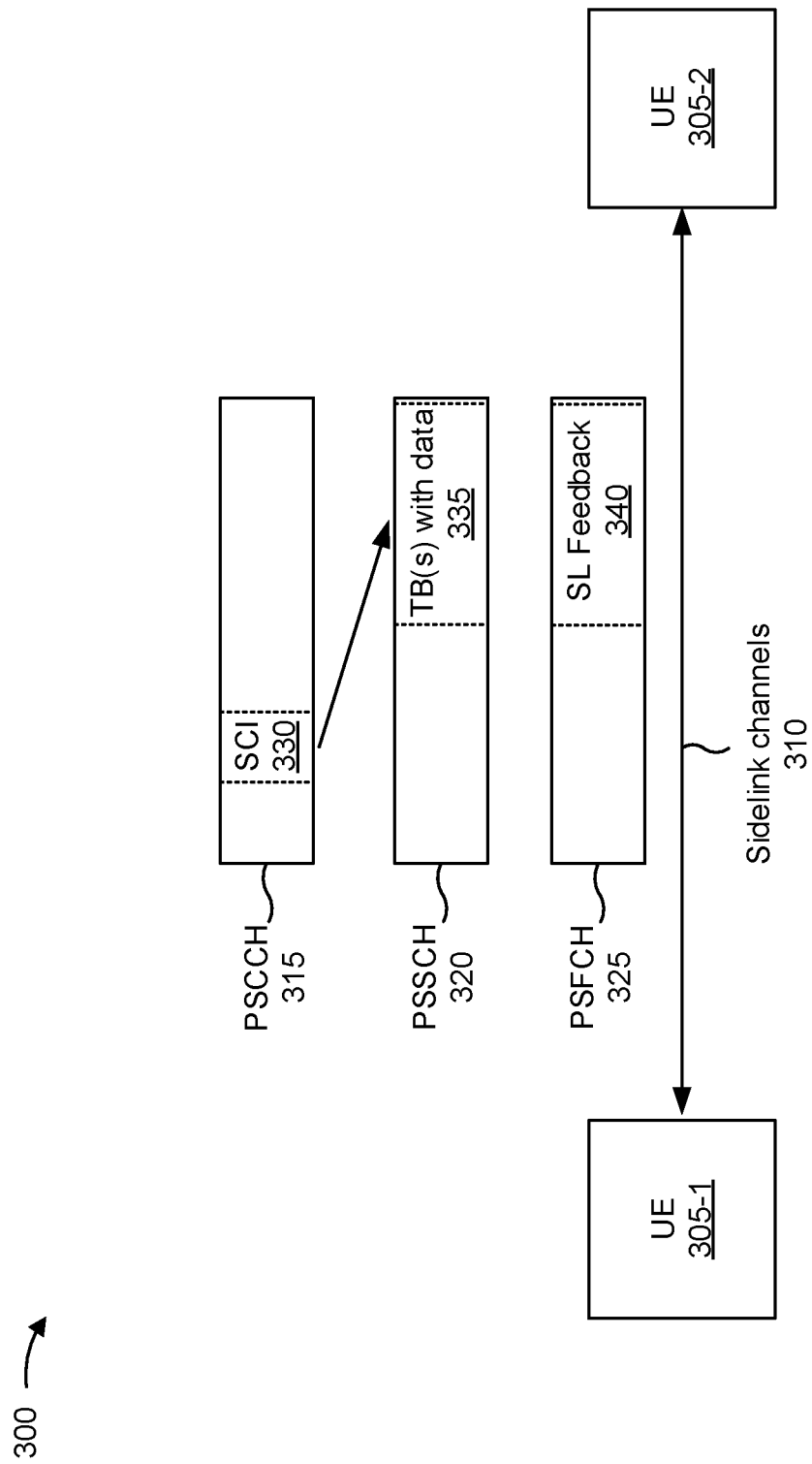
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a PDSCH and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., ACK/NACK information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in subchannels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in DCI or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

Sidelink transmissions (which may be referred to herein, interchangeably, as "communications") may have associated priority levels. In some cases, a UE that has a communication with a higher priority level than, or a same priority level as, a priority level of a communication by another UE may preempt the other UE's resource reservation. For example, a first transmitter UE may reserve a sidelink resource for a communication having a first priority level. A transmitter UE is a UE that transmits a communication, is planning to transmit a communication, is capable of transmitting a communication, and/or the like. A second transmitter UE may reserve the same sidelink resource for a communication having a second priority level. If the second priority level is higher than, or the same as, the first priority level, the second transmitter UE's communication may preempt the first UE's communication, in which case the second transmitter UE may transmit using the reserved resource, while the first transmitter UE does not transmit using that resource. This concept of preemption may facilitate transmission of higher priority transmissions when multiple UEs compete for the same resources.

As indicated above, FIG. 3 is provided as an example. Other examples may differ from what is described with respect to FIG. 3.

Figure 4:
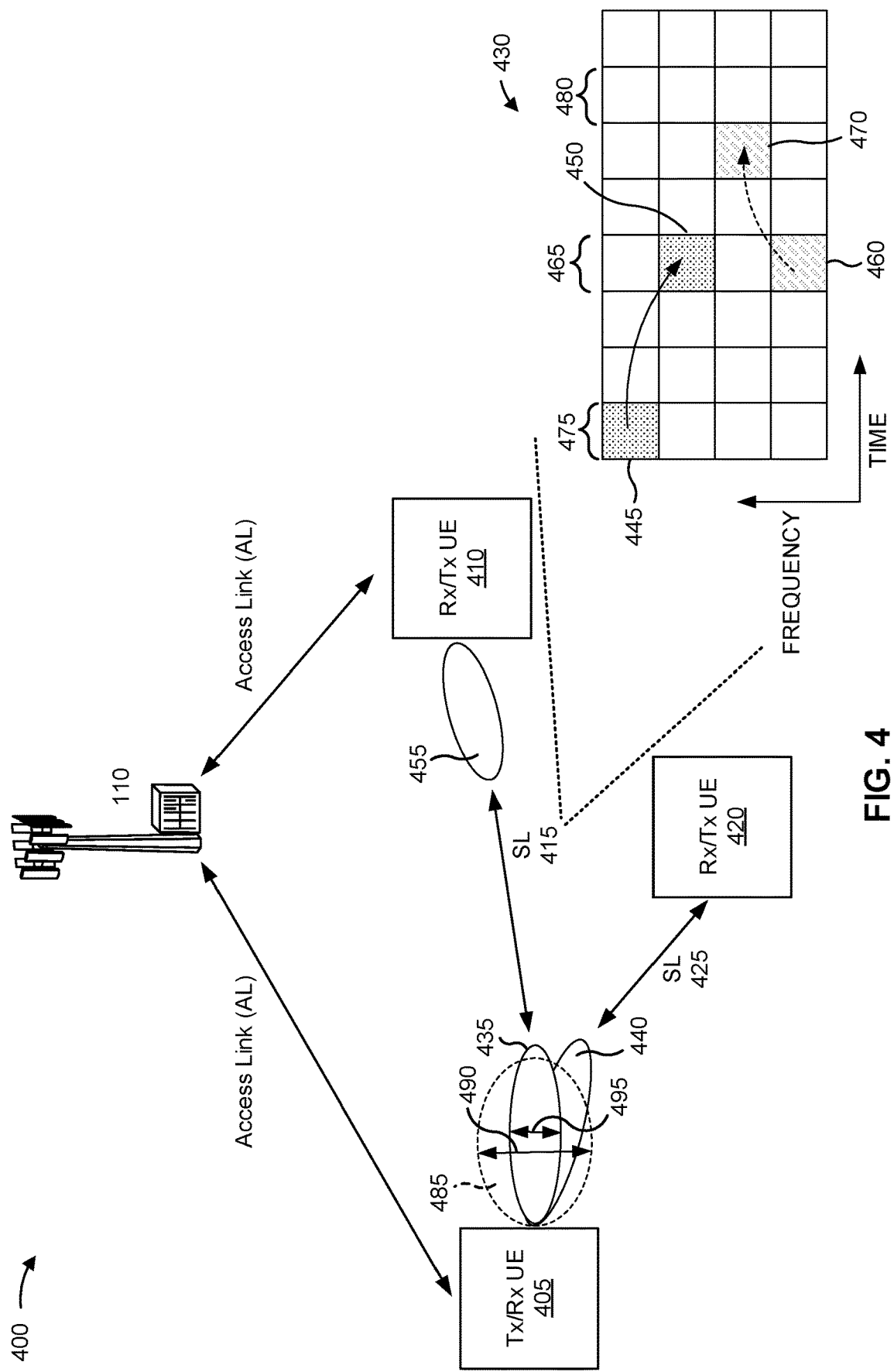
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitting (Tx)/receiving (Rx) UE 405 and an Rx/Tx UE 410 may communicate with one another via a sidelink (shown as "SL") 415, as described above in connection with FIG. 3. Additionally, the Tx/Rx UE 405 and an Rx/Tx UE 420 may communicate with one another via a sidelink (shown as "SL") 425. In some cases, the sidelink 415 and the sidelink 425 may be associated with a set 430 of sidelink resources, as shown.

As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405, the Rx/Tx 410, and/or the Rx/Tx UE 420 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In millimeter wave sidelink communication environments, beams may be used to transmit and/or receive sidelink communications. For example, the Tx/Rx UE 405 may indicate, in SCI, a transmit beam 435 that the Tx/Rx UE 405 will use to transmit communications in future reserved slots. However, the Rx/Tx UE 410 may not be able to determine the transmit beam or an appropriate corresponding receive beam to be used for communication of the SCI. Additionally, the Tx/Rx UE 405 may not be able to determine an appropriate transmit beam to be used to transmit the SCI so that the Rx/Tx UE 410 may receive the SCI and so that the Rx/Tx UE 420 will receive the SCI and/or other communications. For example, the transmit beam 435 may be oriented so that the Rx/Tx UE 410 may receive a communication that is transmitted using the transmit beam 435, but the transmit beam 435 may not be useful for transmitting a communication to be received by the Rx/Tx UE 420. In some cases, for example, a different transmit beam 440 may be more appropriate for transmitting communications for the Rx/Tx UE 420 to receive. Similarly, the Rx/Tx UE 410 and/or the Rx/Tx UE 420 may not be able to determine appropriate receive beams for receiving communications from the Tx/Rx UE 405 and/or other UEs.

In some cases, the Rx/Tx UE 410 can receive and decode a first SCI communication transmitted using a sidelink resource 445. The sidelink resource 445 may include a frequency domain resource (e.g., one or more subchannels, and/or the like), a time domain resource (e.g., one or more slots, and/or the like), and/or the like. The first SCI can indicate a future reserved resource 450 for transmission of a subsequent communication and a transmit beam 435 to be used to transmit the subsequent communication. Accordingly, the Rx/Tx UE 410 may be able to determine an Rx beam 455 to be used to receive the subsequent communication. However, the Rx beam 455 may not be useful for receiving a transmission from the Rx/Tx UE 420. As a result, for example, if the Rx/Tx UE 410 uses the Rx beam 455, and the Tx/Rx UE 405 uses the transmit beam 435, for communication of the subsequent communication, the Rx/Tx UE 410 may fail to receive a first SCI transmitted by the Rx/Tx UE 420 using a sidelink resource 460 that is transmitted in a same slot 465 as the transmission of the subsequent communication. Consequently, the Rx/Tx UE 410 also may fail to receive a subsequent transmission by the Rx/Tx UE 420 that is transmitted using a sidelink resource 470. The inability to coordinate sidelink resources and beams described above may lead to increased retransmissions and communication latency, thereby having a negative impact on network performance.

Some aspects of the techniques and apparatuses described herein may facilitate resource allocation for avoiding beam conflicts such as those described above. For example, in some aspects, a UE may receive a sidelink configuration that indicates a set of sidelink slots that includes a first subset of sidelink slots to be used for first transmissions of sidelink communications and a second subset of sidelink slots to be used for second transmissions of the sidelink communications. The UE may communicate based at least in part on the sidelink configuration. For example, as shown in FIG. 4, a slot 475 and a slot 480 may be configured for first transmissions, while the remaining slots in the set of slots corresponding to the set 430 of sidelink resources may be configured for second (or other subsequent) transmissions. In this way, chances that a UE misses a first sidelink communication from another UE due to receiving a second communication via a receive beam that is not appropriately oriented for the first sidelink communication are reduced, having a positive impact on network performance.

In some aspects, the transmitting UE may use a wider beam to transmit a first communication than a beam it uses to transmit a second communication. For example, as shown in FIG. 4, the Tx/Rx UE 405 may use a transmit beam 485 to transmit a first communication (e.g., an SCI communication) and a transmit beam 435 to transmit a second communication (e.g., a retransmission). The transmit beam 485 may be wider than the transmit beam 435. "Wide" and "narrow" are relative terms that may be used herein to characterize a magnitude of a beamwidth in an azimuth plane and/or an elevation plane with respect to a magnitude of at least one other beamwidth in an azimuth plane and/or an elevation plane. For example, a wide beam may be a first beam having a beamwidth that is larger in magnitude that a beamwidth of a second beam. The second beam may be referred to as a narrow beam.

For example, as shown, the wide transmit beam 485 may have a first beamwidth 490 represented by the illustrated conceptual dimension. The illustrated conceptual dimension is used for the purpose of illustrating the concept of beamwidth and may represent a first beamwidth magnitude in an azimuth plane and/or a first beamwidth magnitude in an elevation plane. The first beamwidth 490 may be larger than a second beamwidth 495 of a narrow transmit beam 435. The second beamwidth 495 is also illustrated using the conceptual dimension described above and may represent a second beamwidth magnitude in an azimuth plane and/or a second beamwidth magnitude in an elevation plane. As shown, the beam 435 overlaps the beam 485 and, as a result, includes a portion of the beam coverage of the beam 485 and includes a similar (but narrower and more specific) beam direction as the beam 485. Similarly, in some aspects, a receiving UE may use a wider receive beam to receive a first transmission than a receive beam used to receive a second transmission. In this manner, some aspects may facilitate increasing the likelihood of successful communications, thereby having a positive impact on network performance.

In some aspects, a transmitting sidelink UE may receive, from a receiving sidelink UE, an indication of beam information associated with a beam to be used to communicate with the receiving sidelink UE and the transmitting UE may transmit a sidelink communication to the receiving sidelink UE based at least in part on the beam information. In this way, some aspects may further increase the likelihood of successful communications, thereby having a positive impact on network performance.

As indicated above, FIG. 4 is provided as an example. Other examples may differ from what is described with respect to FIG. 4.

Figure 5:
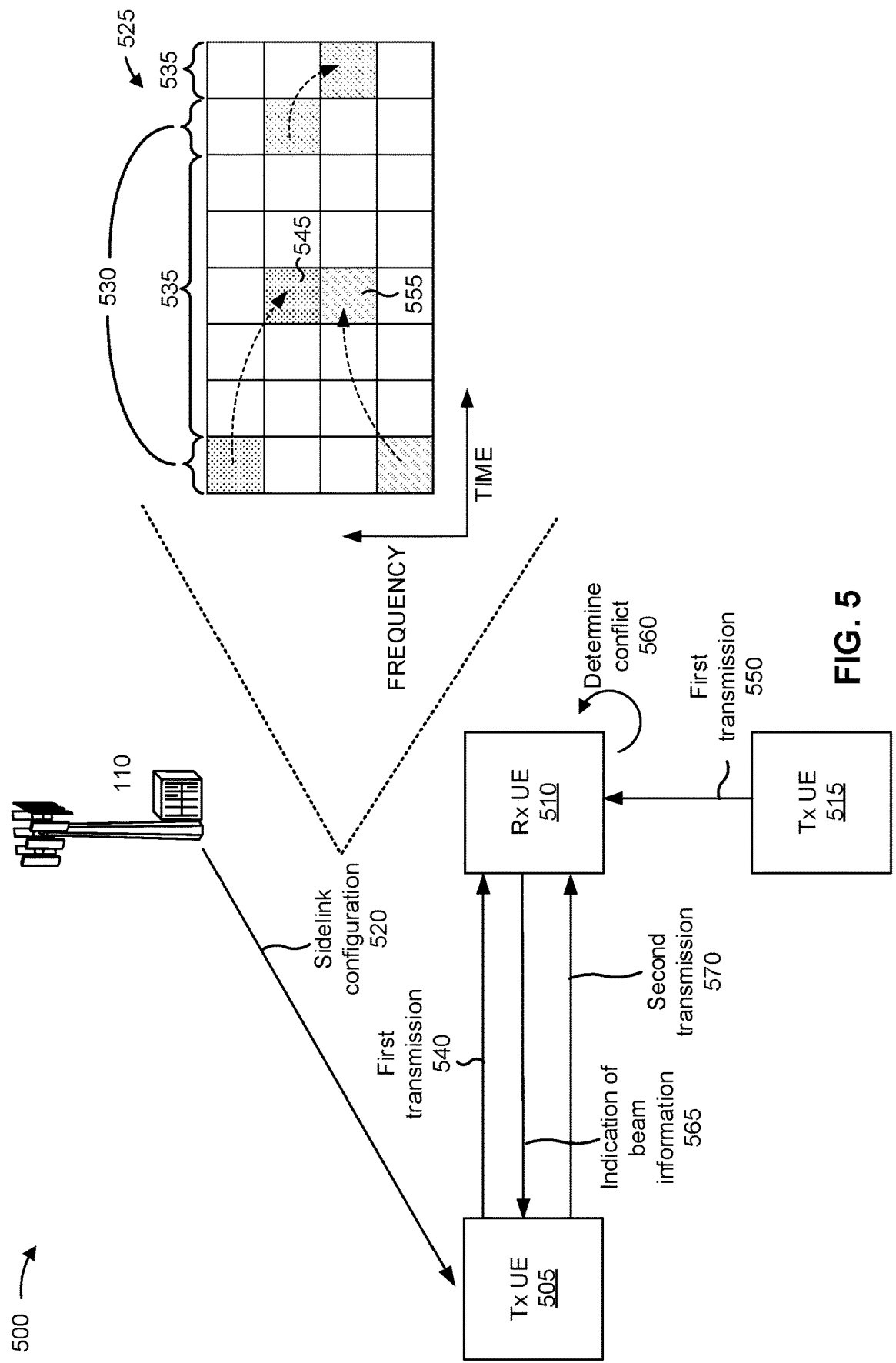
FIG. 5 is a diagram illustrating an example associated with resource allocation for avoiding beam conflict in sidelink communications, in accordance with the present disclosure.

FIG. 5 is a diagram illustrating an example 500 of techniques for resource allocation for avoiding beam conflict in sidelink communications, in accordance with the present disclosure. As shown in FIG. 5, a transmitting sidelink UE 505 (shown as "Tx UE") and a receiving sidelink UE 510 (shown as "Rx UE") may communicate with one another via a sidelink. Additionally, a transmitting sidelink UE 515 (shown as "Tx UE") and the receiving sidelink UE 510 may communicate with one another via a sidelink. A base station 110 may communicate with the transmitting sidelink UE 505 via an access link. In some aspects, the base station 110 may communicate with the receiving sidelink UE 510 and/or the transmitting sidelink UE 515.

As shown by reference number 520, the base station 110 may transmit, and the transmitting sidelink UE 505 may receive, a sidelink configuration. The sidelink configuration may indicate a set 525 of sidelink slots. The set 525 of sidelink slots may include a first subset 530 of sidelink slots to be used for first transmissions of sidelink communications and a second subset 535 of sidelink slots to be used for second transmissions of the sidelink communications. In some aspects, the sidelink configuration may explicitly indicate only the first subset 530 of sidelink slots. In some aspects, the sidelink configuration may explicitly indicate the first subset 530 of sidelink slots and the second subset 535 of sidelink slots. In some aspects, the sidelink configuration may indicate a first transmit beam width, a second transmit beam width, and/or a relationship between the first transmit beam width and the second transmit beam width. In some aspects, the sidelink configuration may indicate a first receive beam width, a second receive beam width, and/or a relationship between the first receive beam width and the second receive beam width.

In some aspects, the transmitting sidelink UE 505, the receiving sidelink UE 510, and the transmitting sidelink UE 515 may communicate based at least in part on the sidelink configuration. For example, as shown by reference number 540, the transmitting sidelink UE 505 may transmit, and the receiving sidelink UE 510 may receive, a first transmission of a sidelink communication in a first slot of the first subset 530 of sidelink slots. The first transmission may, for example, include SCI that indicates a sidelink resource 545 that is reserved for a second communication.

As shown by reference number 550, the transmitting sidelink UE 515 may transmit, and the receiving sidelink UE 510 may receive, a first transmission of an additional sidelink communication. For example, the first transmission transmitted by the transmitting sidelink UE 515 may include SCI that indicates a sidelink resource 555 that is reserved for a second communication by the transmitting sidelink UE 515. As shown by reference number 560, the transmitting sidelink UE 515 may determine, based at least in part on the additional sidelink communication, a conflict associated with a second communication by the transmitting sidelink UE 505 and the second transmission by the transmitting sidelink UE 515. For example, in some aspects, the transmitting sidelink UE 515 may determine a conflict between a future retransmission of the additional sidelink communication and a second transmission by the transmitting sidelink UE 505.

As shown by reference number 565, the receiving sidelink UE 510 may transmit, and the transmitting sidelink UE 505 may receive, an indication of beam information associated with a beam to be used to communicate with the receiving sidelink UE 510. In some aspects, the receiving sidelink UE 510 may transmit the indication of the beam information based at least in part on the determination of the conflict. In some aspects, the indication of the beam information may include an indication a slot to be used by the transmitting sidelink UE 505 to transmit the sidelink communication to the receiving sidelink UE 510, where the slot is associated with a receive beam of the receiving sidelink UE 510, a transmit beam width to be used by the transmitting sidelink UE to transmit the sidelink communication to the receiving sidelink UE, and/or a relative transmit beam width to be used by the transmitting sidelink UE to transmit the sidelink communication to the receiving sidelink UE, among other examples.

In some aspects, the receiving sidelink UE 510 may determine, that the sidelink communication from the transmitting sidelink UE 515 has a priority level that is higher than a priority level of the sidelink communication from the transmitting sidelink UE 505. The indication of the beam information may indicate a transmit beam width associated with the sidelink communication from the transmitting sidelink UE 505, where the transmit beam width is larger than an additional transmit beam width associated with the sidelink communication from the transmitting sidelink UE 515. In some aspects, the indication of the beam information may include a relative transmit beam width that indicates a difference between the transmit beam width and the additional transmit beam width.

As shown by reference number 570, the transmitting sidelink UE 505 may transmit, and the receiving sidelink UE 510 may receive, a second sidelink transmission. In some aspects, the transmitting sidelink UE 505 may transmit the second transmission based at least in part on the indication of the beam information. In some aspects, for example, the transmitting sidelink UE 505 may transmit a retransmission of the first sidelink communication in a second slot of the second subset 535 of sidelink slots. In some aspects, the transmitting sidelink UE 505 may transmit a retransmission of the first sidelink communication in a second slot of the first subset 530 of sidelink slots. For example, the transmitting sidelink UE 505 may determine that a feedback communication associated with the first transmission has not been received. The transmitting sidelink UE 505 may transmit the retransmission in the second slot of the first subset 530 of sidelink slots based at least in part on the determination that the feedback communication has not been received.

In some aspects, the transmitting sidelink UE 505 may transmit, using a first transmit beam having a first transmit beam width, the first transmission in a first slot of the first subset 530 of sidelink slots and may transmit, using a second transmit beam having a second transmit beam width, a retransmission of the first sidelink communication in a second slot of the second subset 535 of sidelink slots, where the first transmit beam width is greater than the second transmit beam width.

As indicated above, FIG. 5 is provided as an example. Other examples may differ from what is described with respect to FIG. 5.

Figure 6:
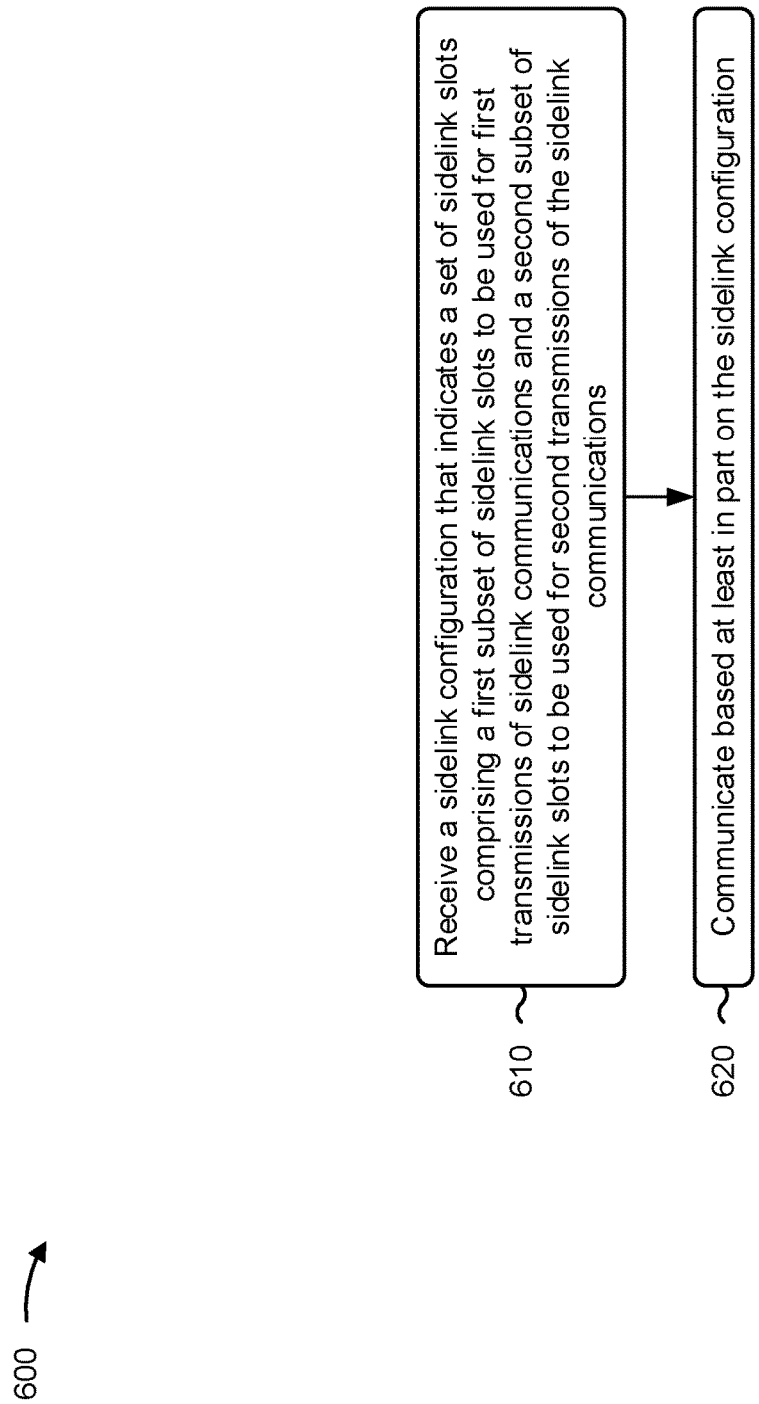
FIGS. 6-8 are diagrams illustrating example processes associated with resource allocation for avoiding beam conflict in sidelink communications, in accordance with the present disclosure.

FIG. 6 is a diagram illustrating an example process 600 performed, for example, by a UE, in accordance with the present disclosure. Example process 600 is an example where the UE (e.g., UE 505 and/or UE 510) performs operations associated with techniques for resource allocation for avoiding beam conflict in sidelink communications.

As shown in FIG. 6, in some aspects, process 600 may include receiving a sidelink configuration that indicates a set of sidelink slots comprising a first subset of sidelink slots to be used for first transmissions of sidelink communications and a second subset of sidelink slots to be used for second transmissions of the sidelink communications (block 610). For example, the UE (e.g., using communication manager 140 and/or reception component 902, depicted in FIG. 9) may receive a sidelink configuration that indicates a set of sidelink slots comprising a first subset of sidelink slots to be used for first transmissions of sidelink communications and a second subset of sidelink slots to be used for second transmissions of the sidelink communications, as described above.

As further shown in FIG. 6, in some aspects, process 600 may include communicating based at least in part on the sidelink configuration (block 620). For example, the UE (e.g., using communication manager 140, reception component 902, and/or transmission component 904, depicted in FIG. 9) may communicate based at least in part on the sidelink configuration, as described above.

Process 600 may include additional aspects, such as any single aspect or any combination of aspects described below and/or in connection with one or more other processes described elsewhere herein.

In a first aspect, the sidelink configuration explicitly indicates only the first subset of sidelink slots. In a second aspect, the sidelink configuration explicitly indicates the first subset of sidelink slots and the second subset of sidelink slots.

In a third aspect, alone or in combination with one or more of the first and second aspects, communicating based at least in part on the sidelink configuration comprises transmitting a first transmission of a sidelink communication in a first slot of the first subset of sidelink slots, and transmitting a retransmission of the sidelink communication in a second slot of the second subset of sidelink slots. In a fourth aspect, alone or in combination with one or more of the first and second aspects, communicating based at least in part on the sidelink configuration comprises transmitting a first transmission of a sidelink communication in a first slot of the first subset of sidelink slots, and transmitting a retransmission of the sidelink communication in a second slot of the first subset of sidelink slots. In a fifth aspect, alone or in combination with the fourth aspect, process 600 includes determining that a feedback communication associated with the first transmission has not been received, wherein transmitting the retransmission in the second slot of the first subset of sidelink slots comprises transmitting the retransmission based at least in part on the determination that the feedback communication has not been received.

In a sixth aspect, alone or in combination with one or more of the first through fifth aspects, communicating based at least in part on the sidelink configuration comprises transmitting, using a first transmit beam having a first transmit beam width, a first transmission of a sidelink communication in a first slot of the first subset of sidelink slots, and transmitting, using a second transmit beam having a second transmit beam width, a retransmission of the sidelink communication in a second slot of the second subset of sidelink slots, wherein the first transmit beam width is greater than the second transmit beam width. In a seventh aspect, alone or in combination with the sixth aspect, the sidelink configuration indicates at least one of the first transmit beam width, the second transmit beam width, or a relationship between the first transmit beam width and the second transmit beam width.

In an eighth aspect, alone or in combination with one or more of the first and second aspects, communicating based at least in part on the sidelink configuration comprises receiving a first transmission of a sidelink communication in a first slot of the first subset of sidelink slots, and receiving a retransmission of the sidelink communication in a second slot of the second subset of sidelink slots. In a ninth aspect, alone or in combination with one or more of the first and second aspects, communicating based at least in part on the sidelink configuration comprises receiving, using a first receive beam having a first receive beam width, a first transmission of a sidelink communication in a first slot of the first subset of sidelink slots, and receiving, using a second receive beam having a second receive beam width, a retransmission of the sidelink communication in a second slot of the second subset of sidelink slots, wherein the first receive beam width is greater than the second receive beam width. In a tenth aspect, alone or in combination with the ninth aspect, the sidelink configuration indicates at least one of the first receive beam width, the second receive beam width, or a relationship between the first receive beam width and the second receive beam width.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
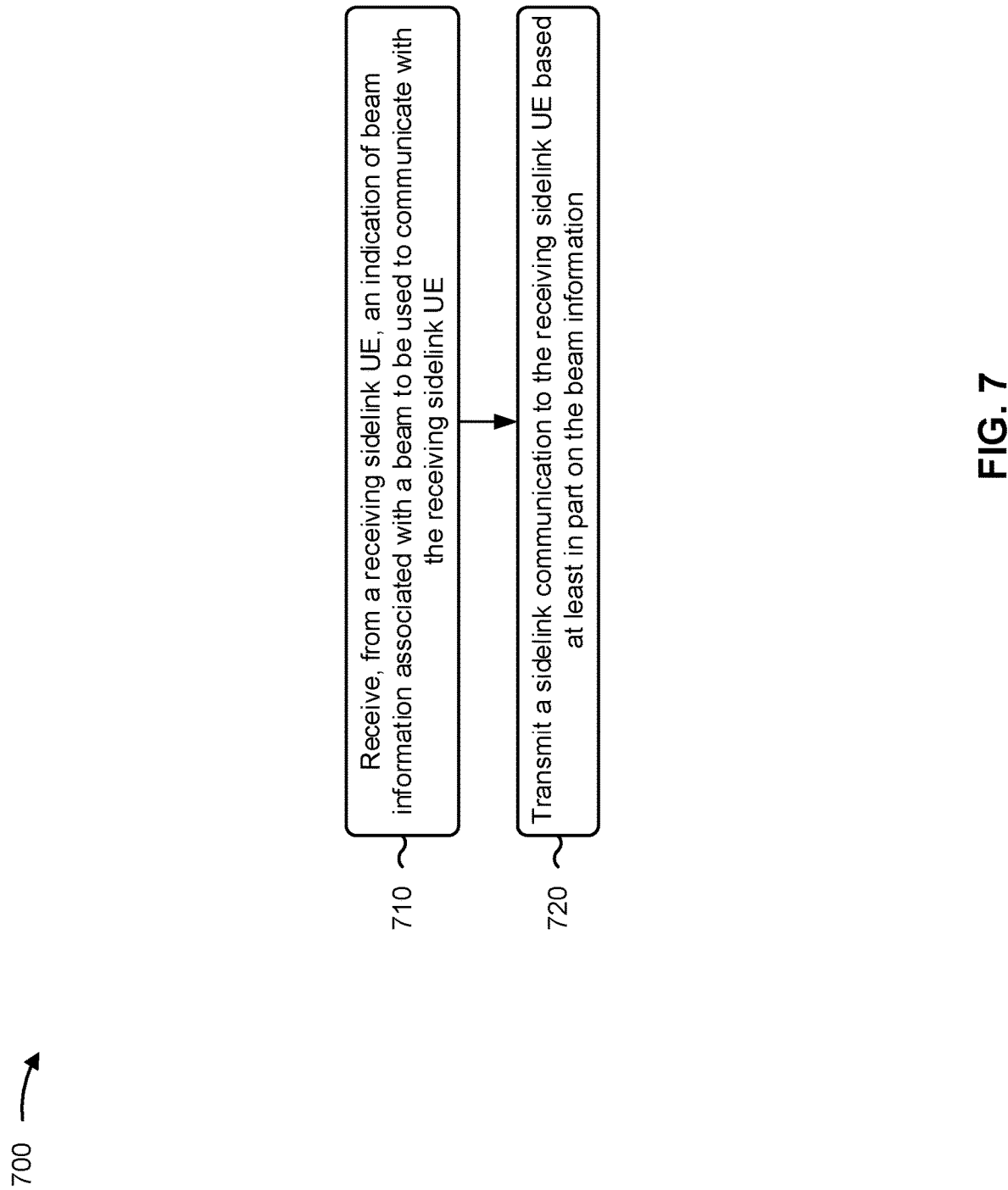

FIG. 7 is a diagram illustrating an example process 700 performed, for example, by a transmitting sidelink UE, in accordance with the present disclosure. Example process 700 is an example where the transmitting sidelink UE (e.g., UE 505) performs operations associated with techniques for resource allocation for avoiding beam conflict in sidelink communications.

As shown in FIG. 7, in some aspects, process 700 may include receiving, from a receiving sidelink UE, an indication of beam information associated with a beam to be used to communicate with the receiving sidelink UE (block 710). For example, the transmitting sidelink UE (e.g., using communication manager 140 and/or reception component 902, depicted in FIG. 9) may receive, from a receiving sidelink UE, an indication of beam information associated with a beam to be used to communicate with the receiving sidelink UE, as described above.

As further shown in FIG. 7, in some aspects, process 700 may include transmitting a sidelink communication to the receiving sidelink UE based at least in part on the beam information (block 720). For example, the transmitting sidelink UE (e.g., using communication manager 140 and/or transmission component 904, depicted in FIG. 9) may transmit a sidelink communication to the receiving sidelink UE based at least in part on the beam information, as described above.

Process 700 may include additional aspects, such as any single aspect or any combination of aspects described below and/or in connection with one or more other processes described elsewhere herein.

In a first aspect, the beam information comprises an indication of at least one of a slot to be used by the transmitting sidelink UE to transmit the sidelink communication to the receiving sidelink UE, wherein the slot is associated with a receive beam of the receiving sidelink UE, a transmit beam width to be used by the transmitting sidelink UE to transmit the sidelink communication to the receiving sidelink UE, or a relative transmit beam width to be used by the transmitting sidelink UE to transmit the sidelink communication to the receiving sidelink UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
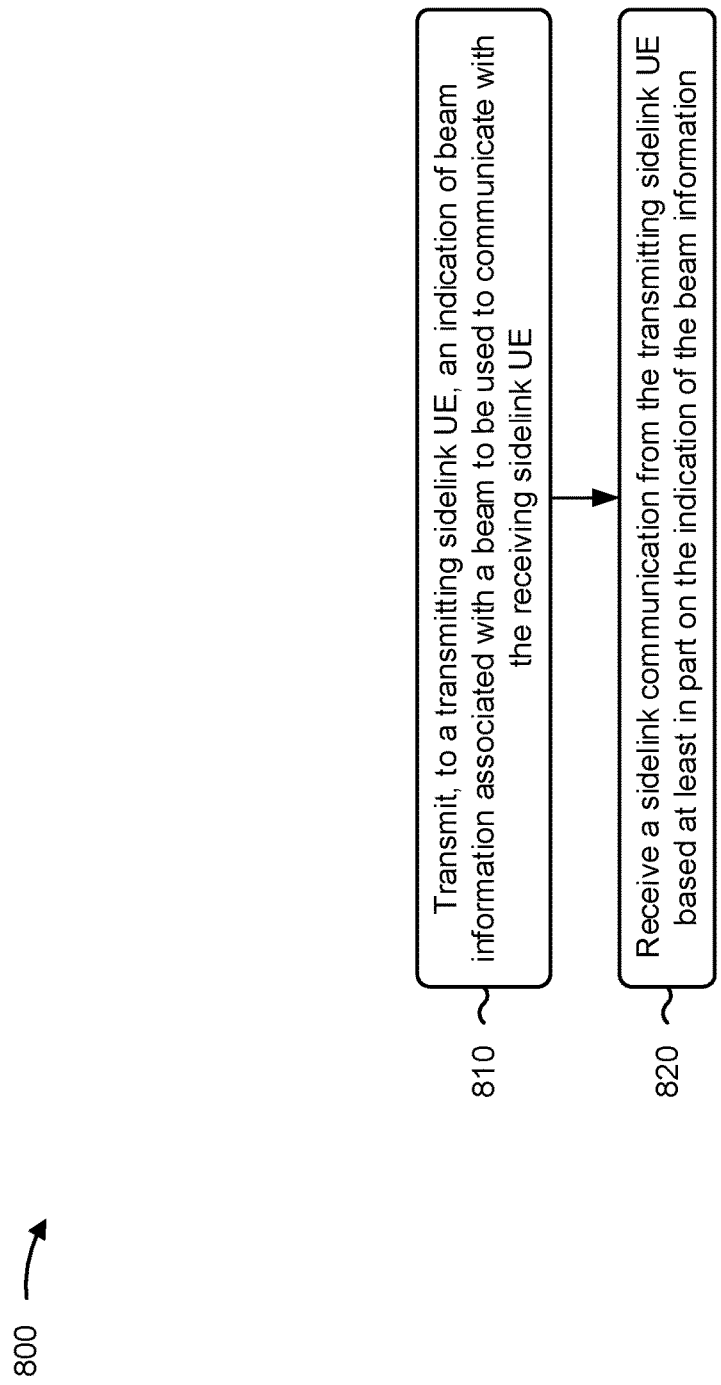

FIG. 8 is a diagram illustrating an example process 800 performed, for example, by a receiving sidelink UE, in accordance with the present disclosure. Example process 800 is an example where the receiving sidelink UE (e.g., UE 510) performs operations associated with techniques for resource allocation for avoiding beam conflict in sidelink communications.

As shown in FIG. 8, in some aspects, process 800 may include transmitting, to a transmitting sidelink UE, an indication of beam information associated with a beam to be used to communicate with the receiving sidelink UE (block 810). For example, the receiving sidelink UE (e.g., using communication manager 140 and/or transmission component 904, depicted in FIG. 9) may transmit, to a transmitting sidelink UE, an indication of beam information associated with a beam to be used to communicate with the receiving sidelink UE, as described above.

As further shown in FIG. 8, in some aspects, process 800 may include receiving a sidelink communication from the transmitting sidelink UE based at least in part on the indication of the beam information (block 820). For example, the receiving sidelink UE (e.g., using communication manager 140 and/or reception component 902, depicted in FIG. 9) may receive a sidelink communication from the transmitting sidelink UE based at least in part on the indication of the beam information, as described above.

Process 800 may include additional aspects, such as any single aspect or any combination of aspects described below and/or in connection with one or more other processes described elsewhere herein.

In a first aspect, the indication of the beam information comprises an indication of at least one of a slot to be used by the transmitting sidelink UE to transmit the sidelink communication to the receiving sidelink UE, wherein the slot is associated with a receive beam of the receiving sidelink UE, a transmit beam width to be used by the transmitting sidelink UE to transmit the sidelink communication to the receiving sidelink UE, or a relative transmit beam width to be used by the transmitting sidelink UE to transmit the sidelink communication to the receiving sidelink UE.

In a second aspect, alone or in combination with the first aspect, process 800 includes receiving, from an additional transmitting sidelink UE, a first transmission of an additional sidelink communication, determining, based at least in part on the additional sidelink communication, a conflict associated with a future retransmission of the additional sidelink communication and the sidelink communication, and transmitting the indication of the beam information based at least in part on the determination of the conflict. In a third aspect, alone or in combination with the second aspect, process 800 includes determining that the additional sidelink communication has a priority level that is higher than a priority level of the sidelink communication.

In a fourth aspect, alone or in combination with the third aspect, the indication of the beam information indicates at least one of the transmit beam width, wherein the transmit beam width is larger than an additional transmit beam width associated with the additional sidelink communication, or the relative transmit beam width, wherein the relative transmit beam width indicates a difference between the transmit beam width and the additional transmit beam width, and wherein the transmit beam width is larger than the additional transmit beam width.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
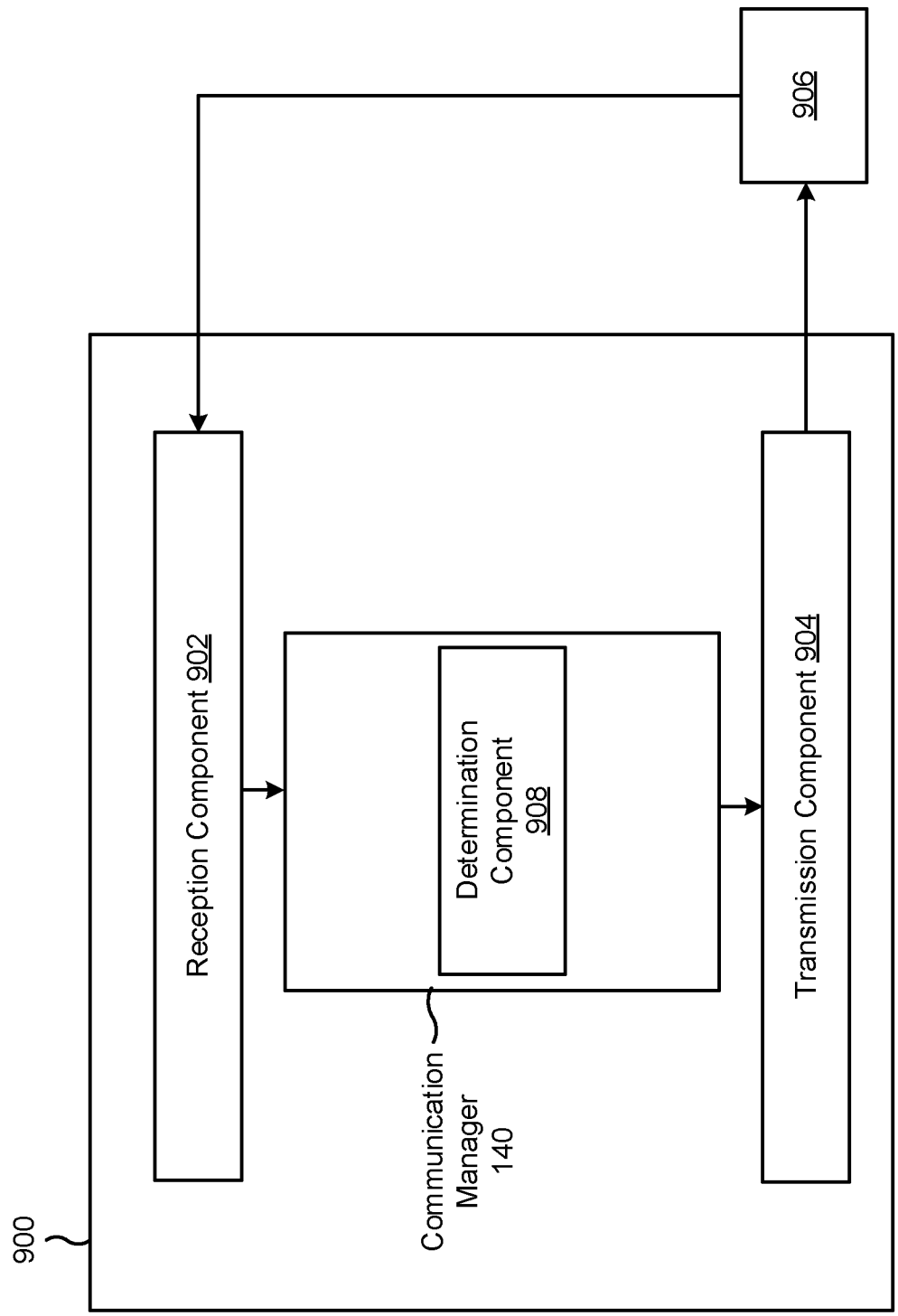
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908.

In some aspects, the apparatus 900 may be configured to perform one or more operations described herein in connection with FIG. 5. Additionally, or alternatively, the apparatus 900 may be configured to perform one or more processes described herein, such as process 600 of FIG. 6, process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a sidelink configuration that indicates a set of sidelink slots comprising a first subset of sidelink slots to be used for first transmissions of sidelink communications and a second subset of sidelink slots to be used for second transmissions of the sidelink communications. The communication manager 140, the reception component 902, and/or the transmission component 904 may communicate based at least in part on the sidelink configuration. In some aspects, the communication manager 140 may include one or more antennas, a modem, a MIMO processor, a transmit processor, a receive processor, a controller/processor, a memory, or a combination thereof, of the UE described in connection with FIG. 2. In some aspects, the communication manager 140 may include the reception component 902 and/or the transmission component 904.

The determination component 908 may determine that a feedback communication associated with the first transmission has not been received, wherein transmitting the retransmission in the second slot of the first subset of sidelink slots comprises transmitting the retransmission based at least in part on the determination that the feedback communication has not been received. In some aspects, the determination component 908 may include one or more antennas, a modem, a modulator, a transmit MIMO processor, a transmit processor, a controller/processor, a memory, or a combination thereof, of the UE described in connection with FIG. 2. In some aspects, the determination component 908 may include the reception component 902 and/or the transmission component 904.

The reception component 902 may receive, from a receiving sidelink UE, an indication of beam information associated with a beam to be used to communicate with the receiving sidelink UE. The transmission component 904 may transmit a sidelink communication to the receiving sidelink UE based at least in part on the beam information.

The transmission component 904 may transmit, to a transmitting sidelink UE, an indication of beam information associated with a beam to be used to communicate with the receiving sidelink UE. The reception component 902 may receive a sidelink communication from the transmitting sidelink UE based at least in part on the indication of the beam information. The reception component 902 may receive, from an additional transmitting sidelink UE, a first transmission of an additional sidelink communication.

The determination component 908 may determine, based at least in part on the additional sidelink communication, a conflict associated with a future retransmission of the additional sidelink communication and the sidelink communication. The transmission component 904 may transmit the indication of the beam information based at least in part on the determination of the conflict. The determination component 908 may determine that the additional sidelink communication has a priority level that is higher than a priority level of the sidelink communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
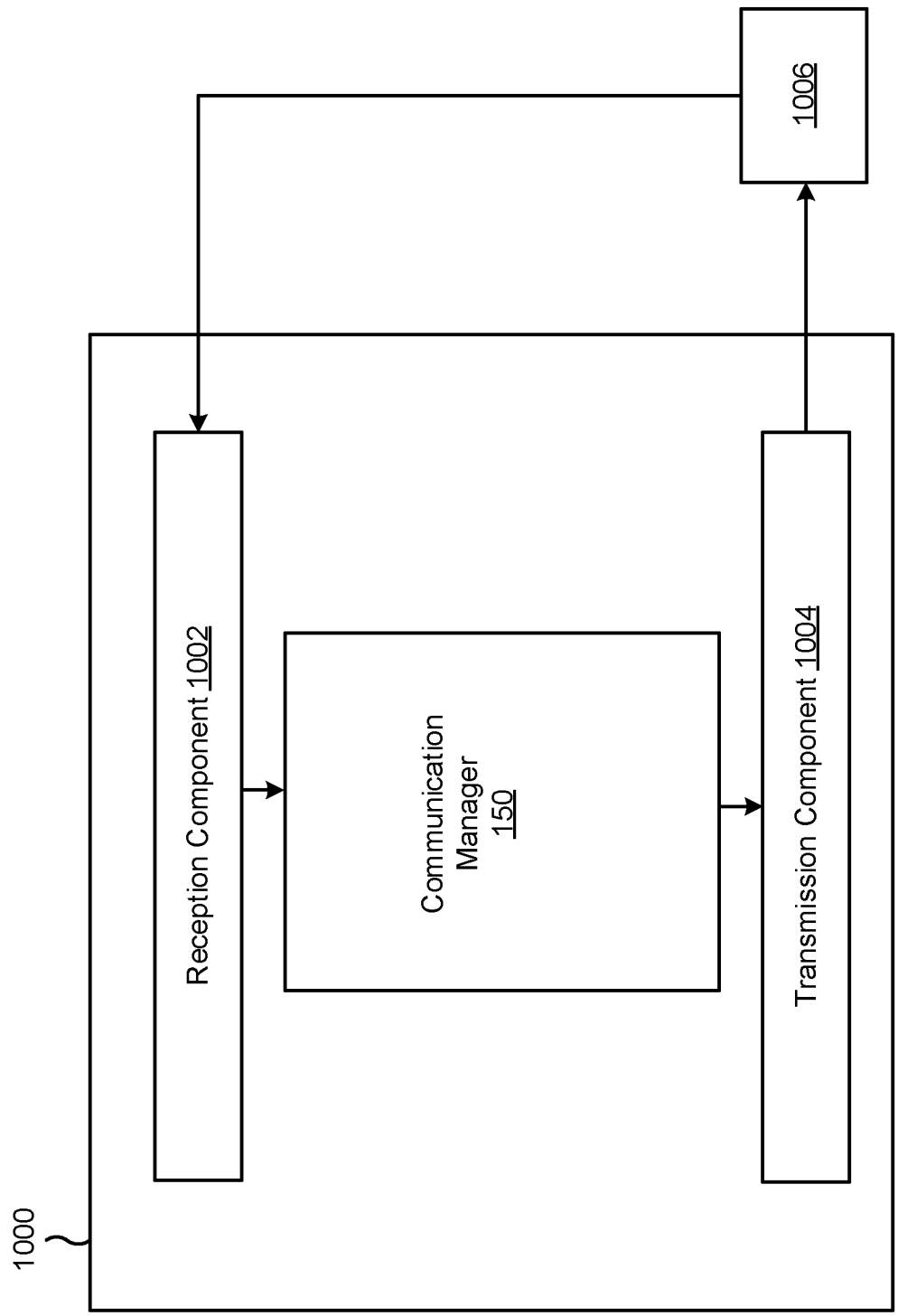

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150.

In some aspects, the apparatus 1000 may be configured to perform one or more operations described herein in connection with FIG. 5. Additionally, or alternatively, the apparatus 1000 may be configured to perform aspects of one or more processes described herein. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

In some aspects, the communication manager 150 may be configured to generate a sidelink configuration that may indicate one or more sidelink resource allocations. In some aspects, the communication manager 150 may control and/or manage one or more aspects, of the reception component 1002 and/or the transmission component 1004. In some aspects, the communication manager 150 may include one or more antennas, a modem, a MIMO processor, a transmit processor, a receive processor, a controller/processor, a memory, or a combination thereof, of the base station described in connection with FIG. 2. In some aspects, the communication manager 150 may include the reception component 1002 and/or the transmission component 1004.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a sidelink configuration that indicates a set of sidelink slots comprising a first subset of sidelink slots to be used for first transmissions of sidelink communications and a second subset of sidelink slots to be used for second transmissions of the sidelink communications; and communicating based at least in part on the sidelink configuration.

Aspect 2: The method of Aspect 1, wherein the sidelink configuration explicitly indicates only the first subset of sidelink slots.

Aspect 3: The method of Aspect 1, wherein the sidelink configuration explicitly indicates the first subset of sidelink slots and the second subset of sidelink slots.

Aspect 4: The method of any of Aspects 1-3, wherein communicating based at least in part on the sidelink configuration comprises: transmitting a first transmission of a sidelink communication in a first slot of the first subset of sidelink slots; and transmitting a retransmission of the sidelink communication in a second slot of the second subset of sidelink slots.

Aspect 5: The method of any of Aspects 1-3, wherein communicating based at least in part on the sidelink configuration comprises: transmitting a first transmission of a sidelink communication in a first slot of the first subset of sidelink slots; and transmitting a retransmission of the sidelink communication in a second slot of the first subset of sidelink slots.

Aspect 6: The method of Aspect 5, further comprising determining that a feedback communication associated with the first transmission has not been received, wherein transmitting the retransmission in the second slot of the first subset of sidelink slots comprises transmitting the retransmission based at least in part on the determination that the feedback communication has not been received.

Aspect 7: The method of any of Aspects 1-6, wherein communicating based at least in part on the sidelink configuration comprises: transmitting, using a first transmit beam having a first transmit beam width, a first transmission of a sidelink communication in a first slot of the first subset of sidelink slots; and transmitting, using a second transmit beam having a second transmit beam width, a retransmission of the sidelink communication in a second slot of the second subset of sidelink slots, wherein the first transmit beam width is greater than the second transmit beam width.

Aspect 8: The method of Aspect 7, wherein the sidelink configuration indicates at least one of the first transmit beam width, the second transmit beam width, or a relationship between the first transmit beam width and the second transmit beam width.

Aspect 9: The method of any of Aspects 1-3, wherein communicating based at least in part on the sidelink configuration comprises: receiving a first transmission of a sidelink communication in a first slot of the first subset of sidelink slots; and receiving a retransmission of the sidelink communication in a second slot of the second subset of sidelink slots.

Aspect 10: The method of any of Aspects 1-3, wherein communicating based at least in part on the sidelink configuration comprises: receiving, using a first receive beam having a first receive beam width, a first transmission of a sidelink communication in a first slot of the first subset of sidelink slots; and receiving, using a second receive beam having a second receive beam width, a retransmission of the sidelink communication in a second slot of the second subset of sidelink slots, wherein the first receive beam width is greater than the second receive beam width.

Aspect 11: The method of Aspect 10, wherein the sidelink configuration indicates at least one of the first receive beam width, the second receive beam width, or a relationship between the first receive beam width and the second receive beam width.

Aspect 12: A method of wireless communication performed by a transmitting sidelink user equipment (UE), comprising: receiving, from a receiving sidelink UE, an indication of beam information associated with a beam to be used to communicate with the receiving sidelink UE; and transmitting a sidelink communication to the receiving sidelink UE based at least in part on the beam information.

Aspect 13: The method of Aspect 12, wherein the beam information comprises an indication of at least one of: a slot to be used by the transmitting sidelink UE to transmit the sidelink communication to the receiving sidelink UE, wherein the slot is associated with a receive beam of the receiving sidelink UE, a transmit beam width to be used by the transmitting sidelink UE to transmit the sidelink communication to the receiving sidelink UE, or a relative transmit beam width to be used by the transmitting sidelink UE to transmit the sidelink communication to the receiving sidelink UE.

Aspect 14: A method of wireless communication performed by a receiving sidelink user equipment (UE), comprising: transmitting, to a transmitting sidelink UE, an indication of beam information associated with a beam to be used to communicate with the receiving sidelink UE; and receiving a sidelink communication from the transmitting sidelink UE based at least in part on the indication of the beam information.

Aspect 15: The method of Aspect 14, wherein the indication of the beam information comprises an indication of at least one of: a slot to be used by the transmitting sidelink UE to transmit the sidelink communication to the receiving sidelink UE, wherein the slot is associated with a receive beam of the receiving sidelink UE, a transmit beam width to be used by the transmitting sidelink UE to transmit the sidelink communication to the receiving sidelink UE, or a relative transmit beam width to be used by the transmitting sidelink UE to transmit the sidelink communication to the receiving sidelink UE.

Aspect 16: The method of Aspect 15, the method further comprising: receiving, from an additional transmitting sidelink UE, a first transmission of an additional sidelink communication; determining, based at least in part on the additional sidelink communication, a conflict associated with a future retransmission of the additional sidelink communication and the sidelink communication; and transmitting the indication of the beam information based at least in part on the determination of the conflict.

Aspect 17: The method of Aspect 16, further comprising determining that the additional sidelink communication has a priority level that is higher than a priority level of the sidelink communication.

Aspect 18: The method of Aspect 17, wherein the indication of the beam information indicates at least one of: the transmit beam width, wherein the transmit beam width is larger than an additional transmit beam width associated with the additional sidelink communication, or the relative transmit beam width, wherein the relative transmit beam width indicates a difference between the transmit beam width and the additional transmit beam width, wherein the transmit beam width is larger than the additional transmit beam width.

Aspect 19: An apparatus for wireless communication at a device, comprising a processor; memory coupled with the processor; and instructions stored in the memory and executable by the processor to cause the apparatus to perform the method of one or more of Aspects 1-11.

Aspect 20: A device for wireless communication, comprising a memory and one or more processors coupled to the memory, the one or more processors configured to perform the method of one or more of Aspects 1-11.

Aspect 21: An apparatus for wireless communication, comprising at least one means for performing the method of one or more of Aspects 1-11.

Aspect 22: A non-transitory computer-readable medium storing code for wireless communication, the code comprising instructions executable by a processor to perform the method of one or more of Aspects 1-11.

Aspect 23: A non-transitory computer-readable medium storing a set of instructions for wireless communication, the set of instructions comprising one or more instructions that, when executed by one or more processors of a device, cause the device to perform the method of one or more of Aspects 1-11.

Aspect 24: An apparatus for wireless communication at a device, comprising a processor; memory coupled with the processor; and instructions stored in the memory and executable by the processor to cause the apparatus to perform the method of one or more of Aspects 12-13.

Aspect 25: A device for wireless communication, comprising a memory and one or more processors coupled to the memory, the one or more processors configured to perform the method of one or more of Aspects 12-13.

Aspect 26: An apparatus for wireless communication, comprising at least one means for performing the method of one or more of Aspects 12-13.

Aspect 27: A non-transitory computer-readable medium storing code for wireless communication, the code comprising instructions executable by a processor to perform the method of one or more of Aspects 12-13.

Aspect 28: A non-transitory computer-readable medium storing a set of instructions for wireless communication, the set of instructions comprising one or more instructions that, when executed by one or more processors of a device, cause the device to perform the method of one or more of Aspects 12-13.

Aspect 29: An apparatus for wireless communication at a device, comprising a processor; memory coupled with the processor; and instructions stored in the memory and executable by the processor to cause the apparatus to perform the method of one or more of Aspects 14-18.

Aspect 30: A device for wireless communication, comprising a memory and one or more processors coupled to the memory, the one or more processors configured to perform the method of one or more of Aspects 14-18.

Aspect 31: An apparatus for wireless communication, comprising at least one means for performing the method of one or more of Aspects 14-18.

Aspect 32: A non-transitory computer-readable medium storing code for wireless communication, the code comprising instructions executable by a processor to perform the method of one or more of Aspects 14-18.

Aspect 33: A non-transitory computer-readable medium storing a set of instructions for wireless communication, the set of instructions comprising one or more instructions that, when executed by one or more processors of a device, cause the device to perform the method of one or more of Aspects 14-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a sidelink configuration that indicates a set of sidelink slots comprising a first subset of sidelink slots to be used for first transmissions of sidelink communications and a second subset of sidelink slots to be used for second transmissions of the sidelink communications; and
   communicating based at least in part on the sidelink configuration, wherein communicating based at least in part on the sidelink configuration comprises:
   receiving, using a first receive beam having a first receive beam width, a first transmission of a sidelink communication in a first slot of the first subset of sidelink slots; and
   receiving, using a second receive beam having a second receive beam width, a retransmission of the sidelink communication in a second slot of the second subset of sidelink slots, wherein the first receive beam width is greater than the second receive beam width.

2. The method of claim 1, wherein the sidelink configuration explicitly indicates only the first subset of sidelink slots.

3. The method of claim 1, wherein the sidelink configuration explicitly indicates the first subset of sidelink slots and the second subset of sidelink slots.

4. The method of claim 1, wherein communicating based at least in part on the sidelink configuration comprises:
   transmitting a first transmission of a sidelink communication in a first slot of the first subset of sidelink slots; and
   transmitting a retransmission of the sidelink communication in a second slot of the second subset of sidelink slots.

5. The method of claim 1, wherein communicating based at least in part on the sidelink configuration comprises:
   transmitting a first transmission of a sidelink communication in a first slot of the first subset of sidelink slots; and
   transmitting a retransmission of the sidelink communication in a second slot of the first subset of sidelink slots.

6. The method of claim 5, further comprising determining that a feedback communication associated with the first transmission has not been received, wherein transmitting the retransmission in the second slot of the first subset of sidelink slots comprises transmitting the retransmission based at least in part on the determination that the feedback communication has not been received.

7. The method of claim 1, wherein communicating based at least in part on the sidelink configuration comprises:
   transmitting, using a first transmit beam having a first transmit beam width, a first transmission of a sidelink communication in a first slot of the first subset of sidelink slots; and
   transmitting, using a second transmit beam having a second transmit beam width, a retransmission of the sidelink communication in a second slot of the second subset of sidelink slots, wherein the first transmit beam width is greater than the second transmit beam width.

8. The method of claim 7, wherein the sidelink configuration indicates at least one of the first transmit beam width, the second transmit beam width, or a relationship between the first transmit beam width and the second transmit beam width.

9. The method of claim 1, wherein communicating based at least in part on the sidelink configuration comprises:
   receiving a first transmission of a sidelink communication in a first slot of the first subset of sidelink slots; and
   receiving a retransmission of the sidelink communication in a second slot of the second subset of sidelink slots.

10. The method of claim 1, wherein the sidelink configuration indicates at least one of the first receive beam width, the second receive beam width, or a relationship between the first receive beam width and the second receive beam width.

11. A method of wireless communication performed by a transmitting sidelink user equipment (UE), comprising:
receiving, from a receiving sidelink UE, an indication of beam information associated with a beam to be used to communicate with the receiving sidelink UE; and
transmitting a sidelink communication to the receiving sidelink UE based at least in part on the beam information, wherein transmitting the sideline communication comprises:
transmitting, using a first transmit beam having a first transmit beam width, a first transmission of a sidelink communication in a first slot of the first subset of sidelink slots; and
transmitting, using a second transmit beam having a second transmit beam width, a retransmission of the sidelink communication in a second slot of the second subset of sidelink slots, wherein the first transmit beam width is greater than the second transmit beam width.

12. The method of claim 11, wherein the beam information comprises an indication of at least one of:
a slot to be used by the transmitting sidelink UE to transmit the sidelink communication to the receiving sidelink UE, wherein the slot is associated with a receive beam of the receiving sidelink UE,
a transmit beam width to be used by the transmitting sidelink UE to transmit the sidelink communication to the receiving sidelink UE, or
a relative transmit beam width to be used by the transmitting sidelink UE to transmit the sidelink communication to the receiving sidelink UE.

13. A user equipment (UE) for wireless communication, comprising:
one or more memories; and
one or more processors, coupled to the one or more memories, configured to cause the UE to:
receive a sidelink configuration that indicates a set of sidelink slots comprising a first subset of sidelink slots to be used for first transmissions of sidelink communications and a second subset of sidelink slots to be used for second transmissions of the sidelink communications; and
communicate based at least in part on the sidelink configuration, wherein communicate based at least in part on the sideline configuration comprises:
receive, using a first receive beam having a first receive beam width, a first transmission of a sidelink communication in a first slot of the first subset of sidelink slots; and
receive, using a second receive beam having a second receive beam width, a retransmission of the sidelink communication in a second slot of the second subset of sidelink slots, wherein the first receive beam width is greater than the second receive beam width.

14. The UE of claim 13, wherein the sidelink configuration explicitly indicates only the first subset of sidelink slots.

15. The UE of claim 13, wherein the one or more processors, to communicate based at least in part on the sidelink configuration, are configured to:
transmit a first transmission of a sidelink communication in a first slot of the first subset of sidelink slots; and
transmit a retransmission of the sidelink communication in a second slot of the second subset of sidelink slots.

16. The UE of claim 13, wherein the one or more processors are further configured to determine that a feedback communication associated with the first transmission has not been received, and wherein the one or more processors, to transmit the retransmission in the second slot of the first subset of sidelink slots, are configured to transmit the retransmission based at least in part on the determination that the feedback communication has not been received.

17. The UE of claim 13, wherein the one or more processors, to communicate based at least in part on the sidelink configuration, are configured to:
transmit, using a first transmit beam having a first transmit beam width, a first transmission of a sidelink communication in a first slot of the first subset of sidelink slots; and
transmit, using a second transmit beam having a second transmit beam width, a retransmission of the sidelink communication in a second slot of the second subset of sidelink slots, wherein the first transmit beam width is greater than the second transmit beam width.

18. The UE of claim 13, wherein the one or more processors, to communicate based at least in part on the sidelink configuration, are configured to:
receive a first transmission of a sidelink communication in a first slot of the first subset of sidelink slots; and
receive a retransmission of the sidelink communication in a second slot of the second subset of sidelink slots.

19. The UE of claim 13, wherein the sidelink configuration explicitly indicates the first subset of sidelink slots and the second subset of sidelink slots.

20. The UE of claim 17, wherein the sidelink configuration indicates at least one of the first transmit beam width, the second transmit beam width, or a relationship between the first transmit beam width and the second transmit beam width.

21. The UE of claim 13, wherein the sidelink configuration indicates at least one of the first receive beam width, the second receive beam width, or a relationship between the first receive beam width and the second receive beam width.

22. A non-transitory computer-readable medium storing a set of instructions for wireless communication, the set of instructions comprising:
one or more instructions that, when executed by one or more processors of a user equipment (UE), cause the UE to:
receive a sidelink configuration that indicates a set of sidelink slots comprising a first subset of sidelink slots to be used for first transmissions of sidelink communications and a second subset of sidelink slots to be used for second transmissions of the sidelink communications; and
communicate based at least in part on the sidelink configuration, wherein communicating based at least in part on the sidelink configuration comprises:
receiving, using a first receive beam having a first receive beam width, a first transmission of a sidelink communication in a first slot of the first subset of sidelink slots; and
receiving, using a second receive beam having a second receive beam width, a retransmission of the sidelink communication in a second slot of the second subset of sidelink slots, wherein the first receive beam width is greater than the second receive beam width.

23. The non-transitory computer-readable medium of claim 22, wherein the sidelink configuration explicitly indicates only the first subset of sidelink slots.

* * * * *